US005620267A

United States Patent [19]
Klauber

[11] Patent Number: 5,620,267
[45] Date of Patent: Apr. 15, 1997

[54] KEYBOARD WITH THUMB ACTIVATED CONTROL KEY

[75] Inventor: Robert D. Klauber, Fairfield, Iowa

[73] Assignee: Keyboard Advancements, Inc., Fairfield, Iowa

[21] Appl. No.: 412,765

[22] Filed: Mar. 29, 1995

Related U.S. Application Data

[63] Continuation-in-part of Ser. No. 137,941, Oct. 15, 1993, abandoned.

[51] Int. Cl.$^6$ ....................................................... B41J 5/10
[52] U.S. Cl. ................................................ 400/486; 400/489
[58] Field of Search ............................... 400/486, 485, 400/489, 488, 473, 472

[56] References Cited

U.S. PATENT DOCUMENTS

| | | | |
|---|---|---|---|
| 2,369,807 | 2/1945 | Solon | 197/98 |
| 4,394,649 | 7/1983 | Suchoff et al. | 340/711 |
| 4,522,518 | 6/1985 | Schmidt | 400/486 |
| 4,698,618 | 10/1987 | Liuzzo et al. | 340/365 |
| 4,824,268 | 4/1989 | Diernisse | 400/486 |
| 5,017,030 | 5/1991 | Crews | 400/485 |
| 5,087,910 | 2/1992 | Guyot-Sionnest | 340/711 |
| 5,458,425 | 10/1995 | Torok | 400/486 |

FOREIGN PATENT DOCUMENTS 2000083  3/1977  United Kingdom.

OTHER PUBLICATIONS

IBM Technical Disclosure Bulletin (vol. 27 No. 10A Mar. 1985).
Final Text of ISO/IEC 9995-1 General Principles governing Keyboard layouts, Int'l organiz for standardization, Riess, Jun. 20, 1991.

*Primary Examiner*—Edgar S. Burr
*Assistant Examiner*—Anthony H. Nguyen

[57] ABSTRACT

The invention relates to an ergonomic keyboard with control key(s) located where a touch typist may activate the keys comfortably via one or both thumbs. The invention is suitable for use with a computer, word processor, electronic typewriter, or the like. It facilitates easy, ergonomic activation of the control function by a touch typist without the necessity of averting the eyes from the text to the keyboard, or uncomfortable stretching of the hands. The invention increases typing efficiency.

19 Claims, 7 Drawing Sheets

KEYBOARD WITH THUMB ACTIVATED CONTROL KEY

BACKGROUND OF THE INVENTION

This application is a C.I.P. of U.S. patent application Ser. No. 08/137,941 filed on Oct. 15, 1993, now abandoned entitled "Ergonomic Non-Alphanumeric Key Activation".

1. Field of the Invention

This invention relates to non-alphanumeric key activation on keyboards for computers, electronic typewriters, word processors, and the like, and more particularly, to an improved method and apparatus for non-alphanumeric key activation which is easier, more efficient, more ergonomic, and permits the touch typist to perform many functions without moving the eyes from the text or moving the hands from their accustomed touch typing position.

2. Description of Prior Art

The standard electronic and computer keyboards of prior art comprise a number of keys which are non-alphanumeric. Such keys include cursor movement (as used herein throughout, the term cursor shall also refer to print mechanism on electronic typewriters, etc.) keys as well as keys for home, end, page up, page down, escape, delete, backspace/erase, insert, tab, backslash, and functions such as control, F1, F2, etc.

Many of these non-alphanumeric keys are typically located in positions on the keyboard which force the touch typist to avert his or her eyes from the copy to the keyboard in order to locate and use these keys.
Typically, the typist must 1) avert the eyes from the copy to the keyboard,
2) remove the hands from their accustomed location,
3) locate and depress the desired key(s), often times looking back and forth to the computer screen (or paper being printed on),
4) look to the keyboard and return hands to original position, and then
5) search the copy to find the proper location to begin inputting again.

This is not only an inconvenience but a waste of valuable time as well. Further, it adds to typist fatigue which can lead directly to lower efficiency and poorer quality work.

With regard to cursor control, some more recent keyboard designs (see, for example, Sprague et al, U.S. Pat. No. 4,795,349) have moved the cursor movement keys into different locations, yet none of these designs eliminate the problem and inefficiencies hereinabove delineated. Other prior art (see the "Thumble-ina" device of Appoint Corporation and the "trackball" of Apple's Macintosh) show control of the cursor using a cursor ball which may be operated by the thumbs and which functions much like a mouse. Keyboards including such cursor balls also include cursor movement keys, and the cursor ball is not intended as a surrogate for the cursor keys, but merely as an additional means for moving the cursor. Each of the two types of means has advantages over the other, and each is a separate device unto itself. Cursor keys, for example, provide the user with a way to back or forward space one space at a time or move up or down one line at a time in discrete steps rather than with the continuous movement provided by a mouse or cursor ball. The present invention is not intended for use in place of a cursor ball or mouse, but rather as an additional means for cursor control which may be used in lieu of the traditional cursor keys.

The invention shown by Crews, U.S. Pat. No. 5,017,030, permits somewhat easier motion of the cursor by a touch typist, but entails learning of a new keyboard layout as well as movement of the thumbs which is not as comfortable or as natural nor which interface as well with the spacebar as that provided by the present invention. Further, unlike the present invention, Crew's invention does not use, and cannot accommodate, the traditional spacebar for spacing which is widespread and found in virtually 100% of the keyboards used today. Still further, Crew's invention is not suitable to today's common keyboard and is not likely to be embraced by keyboard users or keyboard manufacturers since it entails such a radical departure from that to which users have become accustomed.

One keyboard available commercially comprises a single key with ridges on four edges of the top face such that said key may be pushed in four directions from a finger resting on the top face. Each of the four directions activates one of four movements of the cursor, i.e., up, down, right, and left. This cursor movement key is intended for movement by a finger and has not proven as ergonomic as was originally hoped. The motion needed by the finger to control the cursor is neither natural nor comfortable, and users have found it less accurate and efficient than they would like.

Another keyboard design by Outbound in its Laptop System personal computer shows a Track Bar™ located below the center of the spacebar. It may be thumb activated but, as will be shown herein, is not as comfortably or as naturally activated as the present invention. Further, it takes up extra space on the keyboard which may not be necessary with the present invention. Such extra space actually forces the manufacturer to make the keyboard larger, entailing extra expense. It also requires extra space by the user to situate the keyboard. In addition, it moves the cursor in the continuous manner of a mouse or cursor ball rather than the discrete step movements supplied by standard cursor keys and the improved cursor keys of the present invention.

There is therefore, at present, no comfortable, easy means to move the cursor (or typing mechanism) in discrete steps on standard size and design computer or electronic typewriter keyboards without moving the hands from their accustomed touch typing position, stretching of the hands uncomfortably, and/or averting the eyes to look at the keyboard.

The problems inherent with cursor movement are also relevant to other non-alphanumeric keys. The home, end, page up, page down, escape, delete, backspace/erase, insert, tab, backslash, and function keys, in practical applications using standard touch typing keyboards, have entailed activation by the fingers, averting of the eyes from the copy material, and moving or uncomfortable stretching of the hands. Such prior means for activation of non-alphanumeric keys is, of necessity, cumbersome and inefficient. In U.S. Pat. No. 5,143,462 ergonomic thumb activation of the backspace/erase key is shown. The present application extends the inventor's insight shown in that patent to other non-alphanumeric keys.

Objects and Advantages of the Invention

Accordingly, several objects and advantages of the present novel means for activation of non-alphanumeric keys includes a method or means for cursor (or typing mechanism) movement which permits easy, ergonomic, movement of the cursor (or typing mechanism) via thumb movement without having to move the hands to a different location, avert the eyes from the text, stretch uncomfortably, or employ a larger keyboard footprint. This will be less fatiguing on the typist, increase accuracy and efficiency, and provide greater convenience in positioning text within any document.

Further objects and advantages include similar ergonomic thumb activation of other alphanumeric keys which include the home, end, page up, page down, escape, delete, backspace/erase, insert, tab, backslash, and function keys.

Further objects and advantages of the invention will become apparent from a consideration of the ensuing description of it.

SUMMARY OF THE INVENTION

The present invention, in various embodiments, solves the basic problems associated with activation of non-alphanumeric keys on prior art keyboards.

The invention takes advantage of the facts (1) that in present designs one or both thumbs are used solely to depress the spacebar and (2) that the spacebar typically takes up by far the most space of any key on the keyboard. In the present invention, in various embodiments, one or both thumbs may be used comfortably to activate both the spacebar and/or one or more non-alphanumeric keys. The present invention comprises one or more non-alphanumeric keys located on a touch typing type of keyboard such that said key(s) may be within reach of at least one thumb of a touch typist. In the context of the present invention, the term within reach of a thumb shall be interpreted as within comfortable range of a thumb such that a touch typist with hands in touch typing position may comfortably employ thumb activation of key(s) without removing the hands from the touch typing position, looking at the keyboard, or uncomfortable or unusual stretching of the hands.

For example, the basic problem of cursor movement associated with prior art keyboards is solved by positioning one or more cursor movement keys within close proximity of one or more thumbs, such that said keys may be activated by the thumbs without moving the hands from the standard touch typing position. Typically, this may comprise use of region(s) of the keyboard which in standard prior keyboards are occupied by part of the spacebar. In one embodiment, two cursor movement keys may be located on opposite sides of the spacebar and the spacebar may be shortened from that which has been the typical spacebar length in prior art keyboards. In another embodiment, two other cursor movement keys may then be placed just to the outside of the two aforementioned cursor keys, just below those keys (nearer the typist), or just below the spacebar. Further, the thumb activated backspace/erase key shown in U.S. Pat. No. 5,143, 462 may be incorporated such that the usual spacebar is shortened and split into two parts (one for spacing and one for backspace/erasing), and one or more cursor movement keys positioned on either side of, below, or above, the two part split spacebar configuration as described hereinabove.

Other non-alphanumeric activation such as home, end, page up, page down, escape, function, insert, tab, backslash, backspace/erase, and delete may be incorporated in lieu of or in addition to the cursor keys as described in the prior paragraph such that one or more of them may be activated easily and comfortably by thumb movement.

Other embodiments are possible in which a given non-alphanumeric key can have more than one function associated with it. For example, a left arrow cursor movement key may function as a backspace/erase whenever the control (or alt or shift or other key) is simultaneously depressed. Using such multiple function assignments, it is possible to provide many thumb activated non-alphanumeric functions with only one or more keys placed in close proximity to the touch typists thumbs. For example, the split spacebar (right part for spacing, left for backspace/erasing) of U.S. Pat. No. 5,143,462 may function such that depression of the shift (or control or alt or other) key along with the left part of the split spacebar effects left cursor movement; and depression of the shift (or control or alt or other) key along with the fight part effects right cursor movement. This would provide the touch typist the advantage of being able to move the cursor forward and backward along a given line to correct mistakes in other locations of the text comfortably, without having to avert the eyes from the text or stretch the hands uncomfortably.

Many other embodiments may become obvious to those skilled in the art. Any method or apparatus whereby non-alphanumeric keys on standard touch typing keyboards are located within comfortable reach of one or both thumbs of a touch typists hands when in touch typing position comprises the present invention. The invention therefore comprises any keyboard wherein one or more non-alphanumeric keys are located in any region which in traditional keyboards has typically been occupied by some part of the spacebar.

The invention, in its various embodiments, solves the problems associated with prior an in a superior and wholly satisfactory manner.

DETAILED DESCRIPTION OF THE INVENTION

Figure 1:
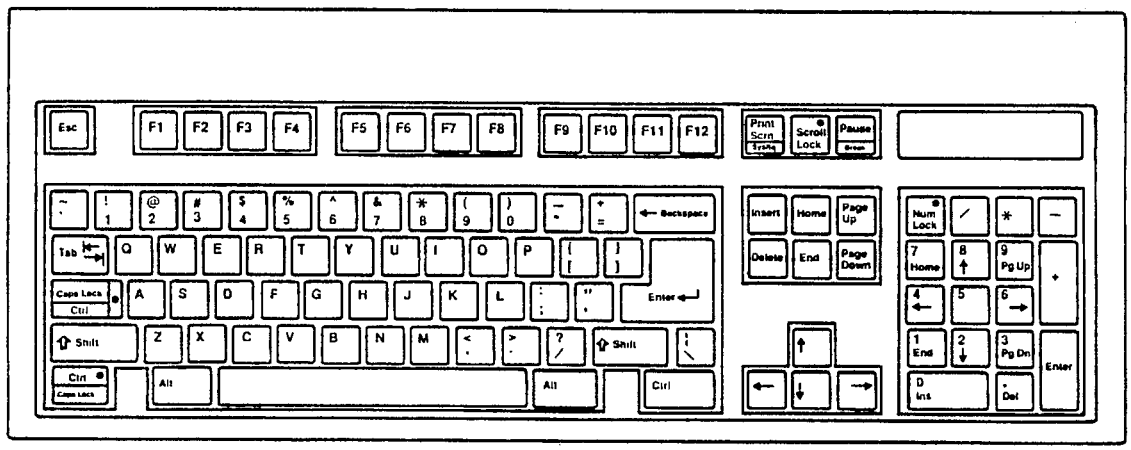
FIG. 1 depicts a standard prior an keyboard showing typical locations for the cursor movement, home key, end key, and other non-alphanumeric keys.

Previous art keyboards have not provided a simple, ergonomic, effective means whereby the touch typist could move the cursor around the document being prepared. Cursor movement was not possible without averting the eyes from the copy, moving at least one hand from its accustomed location, and/or unnatural stretching or motion of the hands. In similar fashion, activation of other non-alphanumeric keys is equally as cumbersome. The present invention, in different embodiments, involves an alternative methodology which solves this and other problems associated with prior art.

It does this by positioning one or more non-alphanumeric key(s) on the keyboard such that one or two thumbs can comfortably activate said keys. This invention has its origin in the inventor's original observation that each finger, as used in touch typing, has anywhere from 3 to 8 different jobs, i.e., hit different keys. Both thumbs together, in contrast, perform a total of one job, i.e., spacing. In addition, the spacebar on typical keyboards occupies far more space than any other key, and far more space than is ever needed by the thumbs to activate it. Since computer and keyboard manufacturers are continually trying to improve their keyboard layouts by more efficient use of the space and arrangement of keys (without modification of the basic layout of the non-alphanumeric keys), it makes good sense to reduce the size of the spacebar to the area only used by the thumbs when actually depressing said spacebar. The space saved thereby could then be used for other commonly used keys (typically other than non-alphanumeric keys) such as the cursor right, cursor left, cursor up, cursor down, home, end, page up, page down, escape, functions like cntrl, F1, F2, etc, insert, backslash, delete, tab, and backspace/erase keys. This not only saves space and uses the available area more effectively, but perhaps more importantly, can make touch typing itself more ergonomic, thus reducing fatigue of the typist while increasing accuracy and speed.

Many possible arrangements and combinations exist wherein comfortable thumb activation of non-alphanumeric functions are possible and will be evident to those skilled in the art. The invention is not limited to any subset of these various arrangements and combinations. The embodiments shown below are not meant as limitations on the invention, and the invention transcends the particular arrangements shown in these embodiments. Any arrangement of non-alphanumeric keys wherein activation of one or more of said keys via comfortable thumb movement is possible is comprised by my invention. Although emphasis herein is on the particular non-alphanumeric keys which move the cursor, the invention applies to all other non-alphanumeric keys as well.

Any means, such as contact switches, etc., which may be used to effect electrical contact and cause input of the appropriate signal representing a given key may be employed. Such means are well known to those skilled in the art, and the present invention offers no alternative structure to the traditional methods and means for accomplishing appropriate electrical activation of a key. Nor does it offer alternative underlying mechanical structure for any keys. Rather, it comprises all such electrical and mechanical means known to those skilled in the art. Such means include the use of keys in combination, e.g. simultaneous depression of a key such as an alt, control, or shift key along with a given key may change the function of said given key. The present invention comprises re-arrangement of the location and in some cases the mechanical shape and size of keys, and otherwise merely incorporates known means, devices, and methods for electric or electronic signal activation.

Embodiment 1

Figure 2:
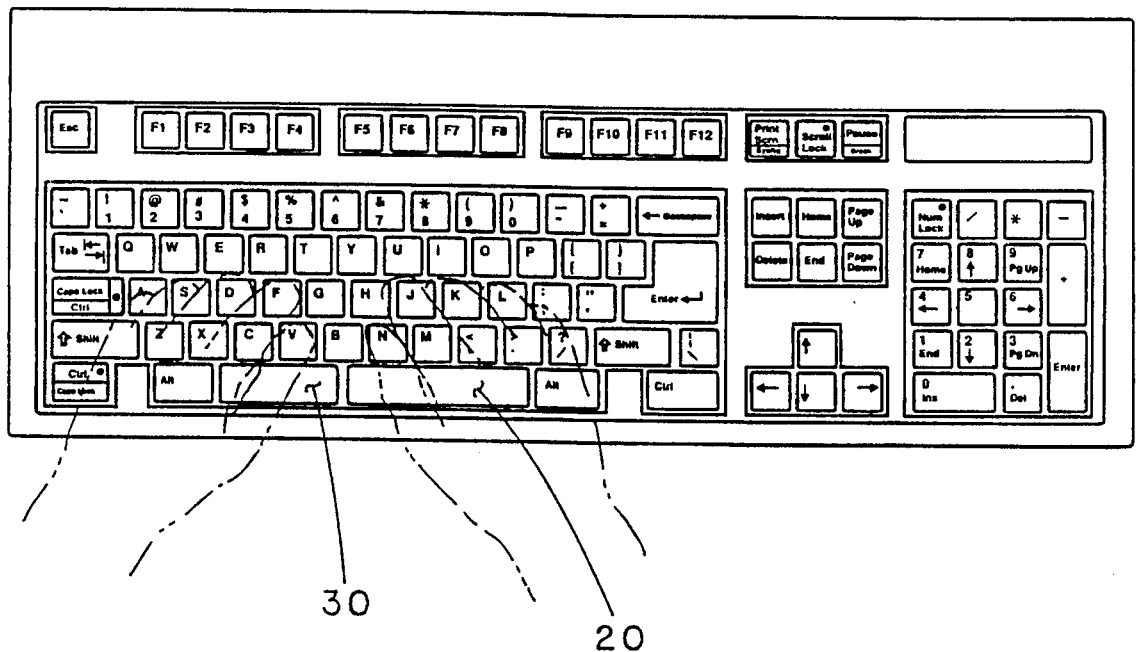
FIG. 2 depicts one embodiment of the present invention with a non-alphanumeric key within comfortable reach of the left thumb of a typist having fingers positioned in touch typing position.

The first embodiment is illustrated in FIG. 2. It comprises spacebar 20 and non-alphanumeric key 30 wherein the non-alphanumeric key 30 occupies a region of the keyboard which in typical prior art is located in, or near, the region of the left part of the spacebar 18 (FIG. 1.) Spacebar 20 of this embodiment may be of shorter length than that of the typical spacebar 18 to accommodate judicious positioning of non-alphanumeric key 30, although this is not necessary. The non-alphanumeric key 30 may be any of the cursor right, cursor left, cursor up, cursor down, home, end, page up, page down, escape, functions like cntrl, F1, F2, etc, insert, backslash, delete, tab, and backspace/erase keys. Non-alphanumeric key 30 in FIG. 2 is situated in an end-to-end position with, and at the right side of spacebar 20. Their ends may be juxtaposed or there may be a space between the two keys, or there may even be one or more other keys between spacebar 20 and non-alphanumeric key 30.

Non-alphanumeric key 30 may have multiple functions. For example, it may be the backspace/erase key (as shown in U.S. patent application Ser. No. 07/339,075) when no other keys are activated either simultaneously with or just prior to it, but it may have other functions when used in tandem with one or more other keys, such as the shin, alt, and control keys. In one case, by holding down the shift key, backspace/erase key 30 may function as a left cursor movement key. By holding down the control key, it may function as a right cursor movement key. In this manner, a touch typist could move left or right on a given line and backspace/erase whatever sections he or she chooses. Additionally, depressing the alt key along with key 30 may cause key 30 to function as an end key. With this added feature the touch typist could move left or right along a line to correct mistakes, and when the mistakes are corrected, simply move quickly and efficiently to the end of the line to begin inputting additional material.

In similar fashion, key 20, which functions normally as a spacebar, may have alternative functions associated with it as well. For example, depression of the shift key prior to or simultaneously with key 20 may cause key 20 to function as a right cursor movement key. Depression of the alt key or the control key in tandem with key 20 may cause key 20 to function as an end key or a home key. Combining the multiple functionality of both keys 20 and 30 may result in a very effective way for the touch typist to move around a document and make corrections without having to avert the eyes from the copy or stretch the hands uncomfortably. One possible combination is shown below:

| In tandem with | key 30 function | key 20 function |
| --- | --- | --- |
| nothing (alone) | backspace/erase | space |
| shift key | left cursor | right cursor |

-continued

| In tandem with | key 30 function | key 20 function |
|---|---|---|
| control | home | end |
| alt | delete | delete |

Other combinations may include cursor up and/or cursor down as alternative key 30 and/or key 20 functions in lieu of any of those shown above. Still other possible combinations may include one or more additional editing functions such as backspace/erase one word per activation and/or delete one word per activation.

Many other possible manifestations of this embodiment would be obvious to those skilled in the art and listing them herein would be an exhaustive process. Any number of different combinations of key 20 and/or key 30 with one or more keys such as the shift, alt, and control keys may result in a wide range of useful combinations of non-alphanumeric key functions. All such combinations are comprised by the present invention.

Further, in this or any embodiment shown or implied, the various functions may be programmable or otherwise chosen by the user (using auxiliary switches, for example) to suit the user's desires. Also, keys which perform any function discussed herein may be left in their standard prior art locations and the keys (such as 20 and 30 and others to be discussed below) which perform like functions merely used in addition, as an added aid to the typist. Maintenance of the original keys may, or may not, be employed.

In this and other embodiments, key 20 is typically the spacebar key. However, key 20 may, in any embodiment, be any other non-alphanumeric key. For example, in the present embodiment, the functions of key 20 and key 30 in FIG. 2 may be exchanged with one another from that described hereinbefore. In all embodiments shown or implied herein, the function of key 20 may be similarly exchanged with any other non-alphanumeric key.

Embodiment 2

Figure 3:
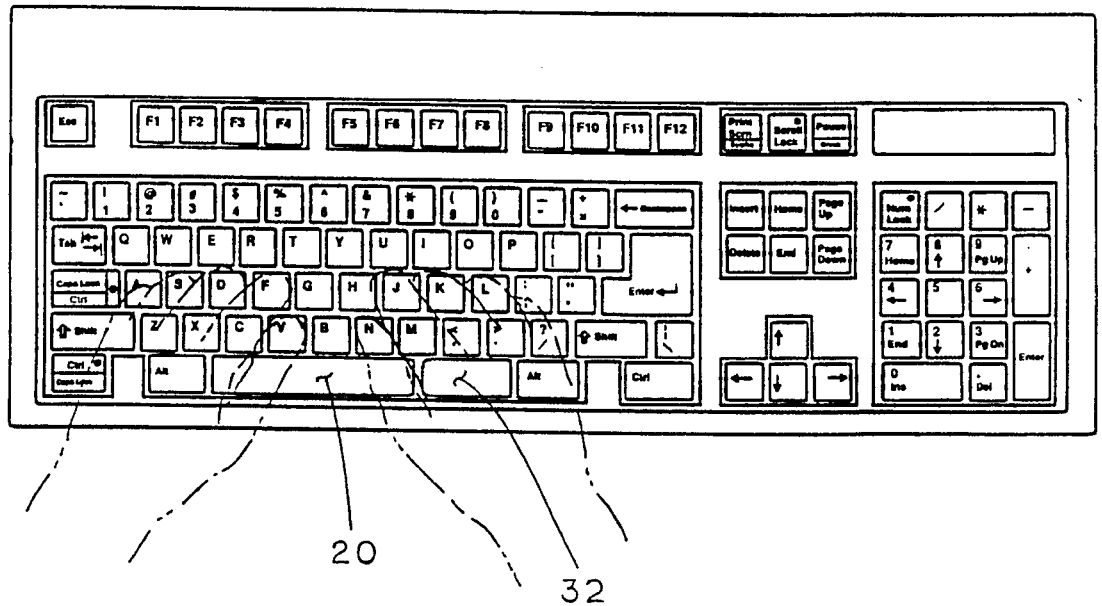
FIG. 3 shows another embodiment of the present invention with a non-alphanumeric key within comfortable reach of the right thumb of a typist having fingers positioned in touch typing position.

A second embodiment is shown in FIG. 3 and comprises a non-alphanumeric key 32 located to the right of spacebar 20. Key 32 functions in a similar manner as does key 30 in embodiment 1. That is, it can function as any non-alphanumeric key such as the cursor right, cursor left, cursor up, cursor down, home, end, page up, page down, escape, function like cntrl, F1, F2, etc., insert, backslash, delete, tab, and backspace/erase keys. In addition, it may have multiple functions when used in tandem with one or more keys such as the shift, alt, and control keys just as key 30 has. Further, key 20 may have such multiple functions as well. All comments made with respect to keys 20 and 30 above are equally applicable to keys 20 and 32 in this embodiment.

Other embodiments wherein the additional key (e.g., 30 or 32) is placed either above or below (nearer or further from the typist than) the spacebar (20 or 18) are also comprised by the invention. All comments made in the discussions of embodiments 1 and 2 are also applicable to these other configurations.

Embodiment 3

Figure 4:
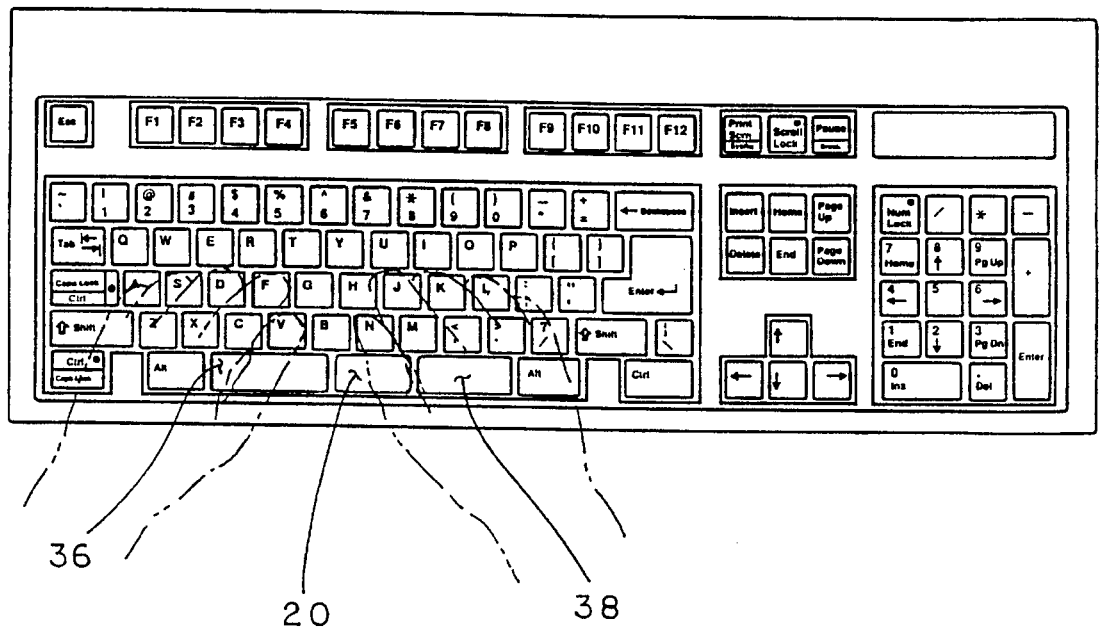
FIG. 4 shows another embodiment of the present invention with generic non-alphanumeric keys on either side of the spacebar such that any of said keys my be activated comfortably with the thumbs.

FIG. 4 illustrates a third embodiment of the invention in which keys 36 and 38 are located on either sides of the spacebar 20. These keys function much like keys 30 and 32 do in earlier embodiments, but the availability and number of functions is enhanced. For example, key 36 may be a backspace/erase key. Key 38 may be a delete key. Or keys 36 and 38 may be cursor left and cursor right keys. Or 36 may be a backspace/erase key with 38 as a left arrow key. 38 or 36 may then also function as a right arrow when used in tandem with another key such as the shift, control, or alt keys. As with previous embodiments, many possible such combinations would be obvious to those skilled in the art, and any and all such combinations are comprised by the invention. Some of these possibilities are shown in the tables below.

| in tandem with | key 36 function | key 20 function | key 38 function |
|---|---|---|---|
| nothing (alone) | left arrow | space | right arrow |
| shift, alt, or control | up arrow | backspace/erase | down arrow |
| one of above not used | home | (possibly delete) | end |
| the third of the above | page up | (insert or escape) | page down |

| in tandem with | key 36 function | key 20 function | key 38 function |
|---|---|---|---|
| nothing (alone) | backspace/erase | space | delete |
| shift, alt, or control | cursor left | (escape or insert) | cursor right |
| one of above not used | home | (escape or insert) | end |
| the third of the above | cursor up | | cursor down |

| in tandem with | key 36 function | key 20 function | key 38 function |
|---|---|---|---|
| nothing (alone) | backspace/erase | space | delete |
| shift, alt, or control | cursor left | (escape or insert) | cursor right |
| one of above not used | back/erase 1 word | cursor up | delete one word |
| the third of the above | cursor left 1 word | cursor down | cursor right 1 word |

Further, in this or any embodiment, key 20 need not be a spacebar. For example, the functions of key 20 and key 36 in the above tables, or in any other suitable configuration, may be interchanged. Similarly, the functions of key 20 and key 38 may be interchanged as well.

Any parts of the above descriptions may be used without incorporating other parts. For example, only line one (the key alone with nothing in tandem) of any of the above tables (or sibling configurations of the above tables) may be incorporated without any of the others. Or alternatively only any two or three lines of any of the above may be used. Further, as with all other embodiments, any combinations of functions not specifically shown herein yet corresponding in spirit to the concept of non-alphanumeric key activation by comfortable thumb movement is comprised by the invention. This includes multiple function use of any such keys as well.

Embodiment 4: The Preferred Embodiment

Figure 5A:
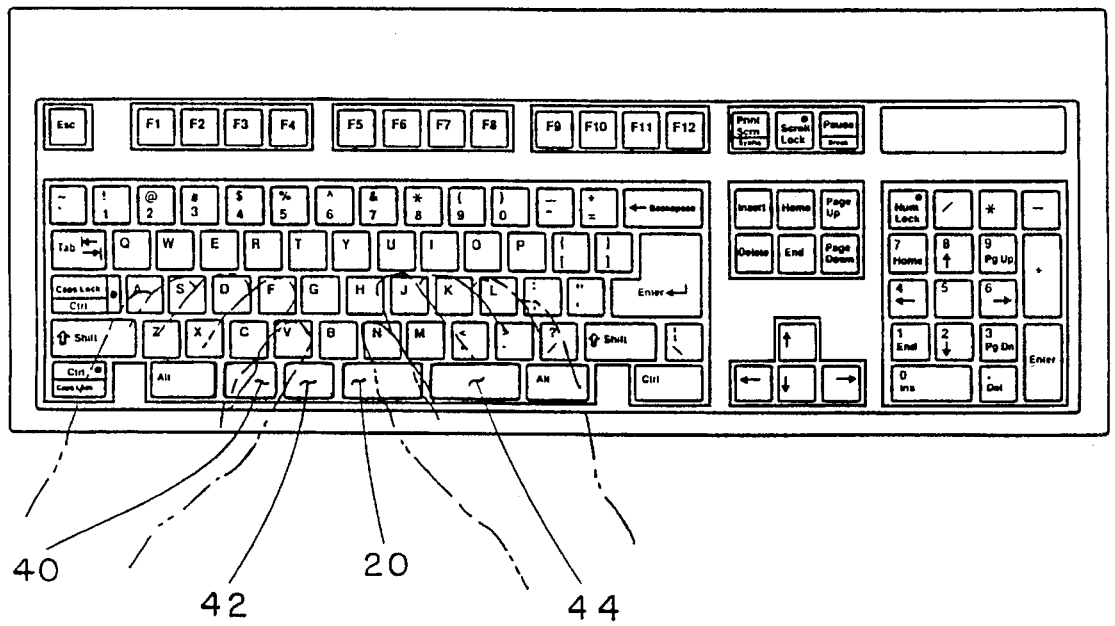
FIG. 5 shows another embodiment of the present invention with additional generic non-alphanumeric keys.
Figure 5B:
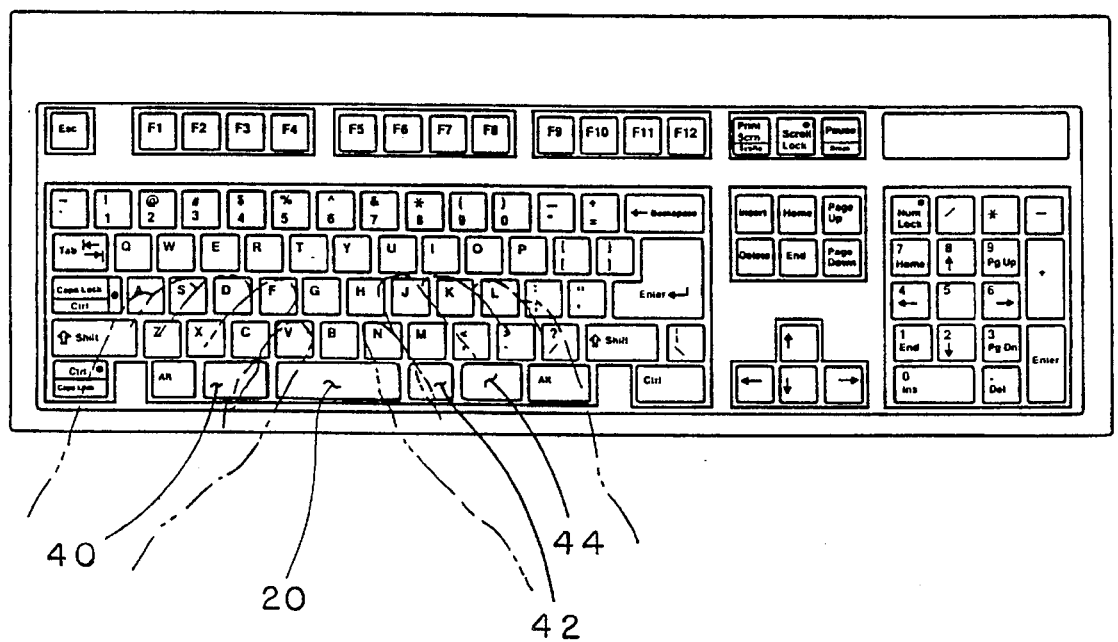

FIG. 5 shows a fourth embodiment of the invention in which three non-alphanumeric keys 40, 42, 44 are placed within comfortable reach of one or two thumbs. These three keys may be arranged in any suitable fashion, one of which such arrangements is depicted in FIG. 5. Key 20 is the spacebar key and it is located in the figure such that the right thumb may activate it most easily. (Almost all touch typists only use the right thumb to activate the spacebar and do not use the left thumb at all.) The other keys may then have typical non-alphanumeric functions such as those discussed elsewhere herein. One particularly advantageous configuration comprises use of key 40 for left cursor movement, key 42 for backspace/erase, and key 44 for right cursor movement. Such a configuration permits the touch typist to move anywhere back and forth across a text line and make corrections easily and efficiently merely by using her thumbs. As in previous embodiments, multiple functions may be assigned to the keys 20, 40, 42, and 44. One possible implementation of such multiple purpose keys is

| in tandem with | key 40 function | key 42 function | key 20 function | key 44 function |
| --- | --- | --- | --- | --- |
| nothing (alone) | left cursor | backspace/ erase | space | right cursor |
| shift, alt, or control | up cursor | page up | page down | down cursor |
| one of above not used | home | (insert or escape) | delete | end |
| the third of the above | move left 1 word | back/erase 1 word | delete 1 word | move right 1 word |

As with all other embodiments, i) any of the functions shown above may be interchanged with any other(s) and any may simply be deleted (not included); and ii) any other function not shown above such as one or more function keys, or backslash may be used in lieu of any function shown above. Also as in all other embodiments, any of the keys 40, 42, and 44 may be above or below the spacebar 20 as well as on either side. Any locations of keys 40, 42, 44 may be immediately adjacent spacebar 20 or may have a space between it and key 20, as in all other embodiments as well. Key 20 may also interchange its spacing function and/or other functions with any of the keys 40, 42, 44. As an example, key 20 and key 42 may be interchanged. In the particular case of the above table, this would mean that the space, page down, delete, delete 1 word functions of column four may be interchanged with the backspace/erase, page up, (insert or escape), and backspace/erase 1 word functions of column three. Further, any of the keys in this or any embodiment may be programmable or otherwise capable of being set to the user's wishes. Switches accessible to the user may be used to set different keys for different functions in any embodiment.

Embodiment 5

Figure 6:
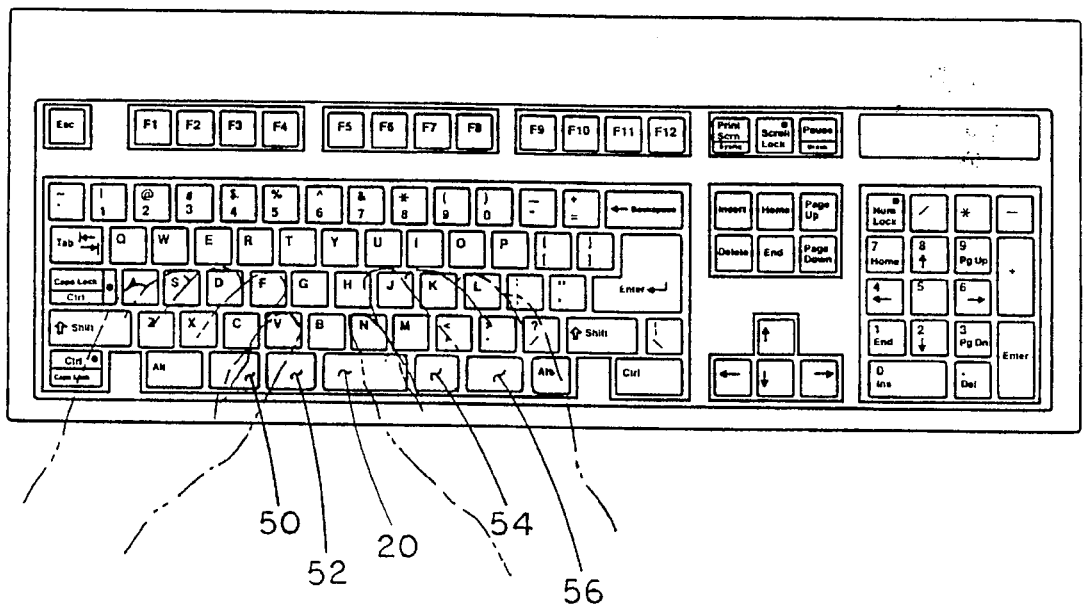
FIG. 6 shows another embodiment of the present invention with yet more generic non-alphanumeric keys.

FIG. 6 depicts one configuration of embodiment 5 in which four non-alphanumeric keys 50, 52, 54, 56 in addition to the space key 20 are within comfortable reach of one or two thumbs. As in all other embodiments, key 20 may perform one or more other functions and not the space function, while one of the other non-alphanumeric keys performs the space function. As with other embodiments, any one or more of the five keys 20,50,52,54,56 may have multiple functions when used in tandem with one or more other keys such as the shift, alt, and control keys. Listing of some possible combinations as was done in prior embodiments would be repetitions, and the present embodiment, like all others, comprises all possible allocations of non-alphanumeric functions to the five keys 20,50,52,54,56. One convenient allocation of functions may be key 50 as left cursor, key 52 as backspace/erase, key 20 as space, key 54 as right cursor, and key 56 as end. In this configuration, the typist may readily move across a line to make correction(s), and when the correcting is finished move quickly back to the end of the line where new input would begin. Other configurations comprise use of key 50 as up cursor, key 52 as left cursor, key 20 as space, key 54 as right cursor, and key 56 as down cursor with or without sub-functions (in combination with other function key(s) such as control, alt, shift) providing backspace/erase, delete, home, end and/or other non-alphanumeric functions.

Figure 7:
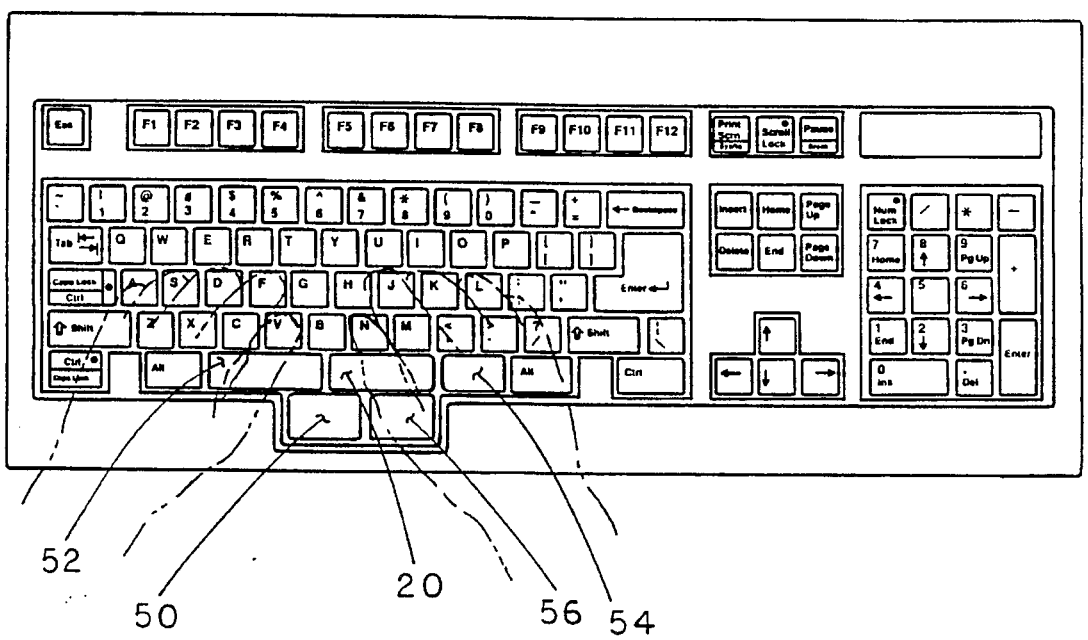
FIG. 7 shows another configuration of the present invention with non-alphanumeric keys located on either side of, and below, the spacebar.
Figure 8:
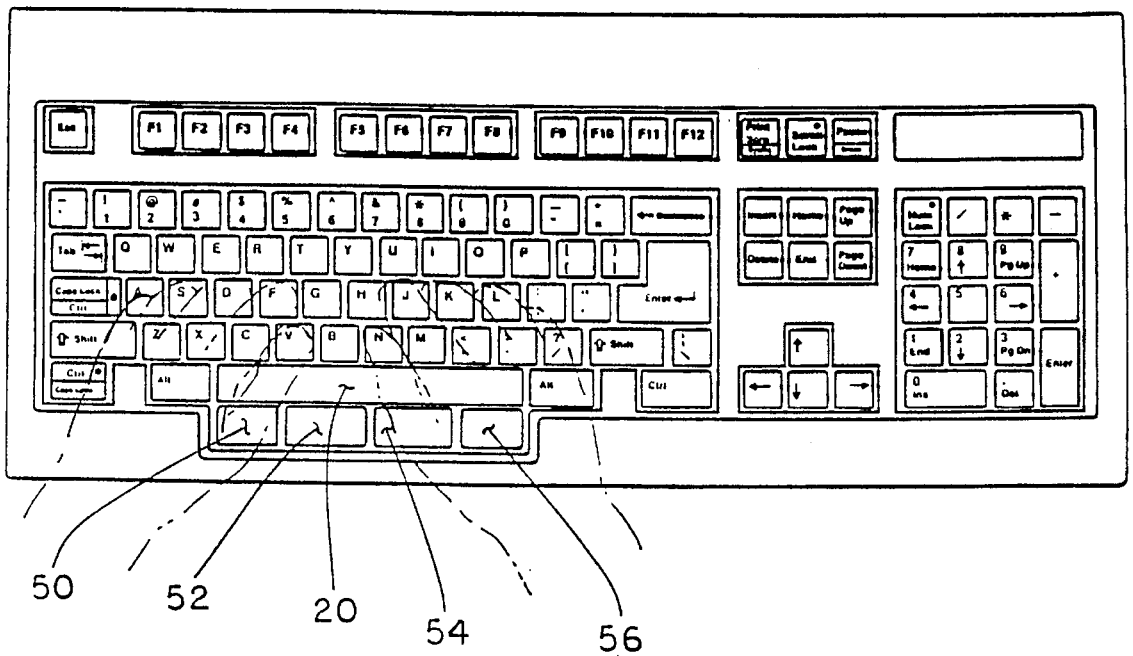
FIG. 8 shows yet another configuration with non-alphanumeric keys below the spacebar.

FIGS. 7 and 8 illustrate alternative configurations for the present embodiment. The aforementioned function allocations, or any other suitable allocations for the keys 20, 50,52,54,56, may be used in FIGS. 7 and 8, and are comprised by the invention. Locations other than those shown in FIGS. 6, 7, and 8 for the five keys 20,50,52,54,56 are also comprised by the invention. As in all other embodiments, any locations within comfortable reach of the thumbs is comprised by the invention. As but one example, in FIG. 7 the key 50 may be re-located under (on the typist side of) the key 52 and/or the key 56 may be re-located under key 54.

Embodiment 6

Figure 9:
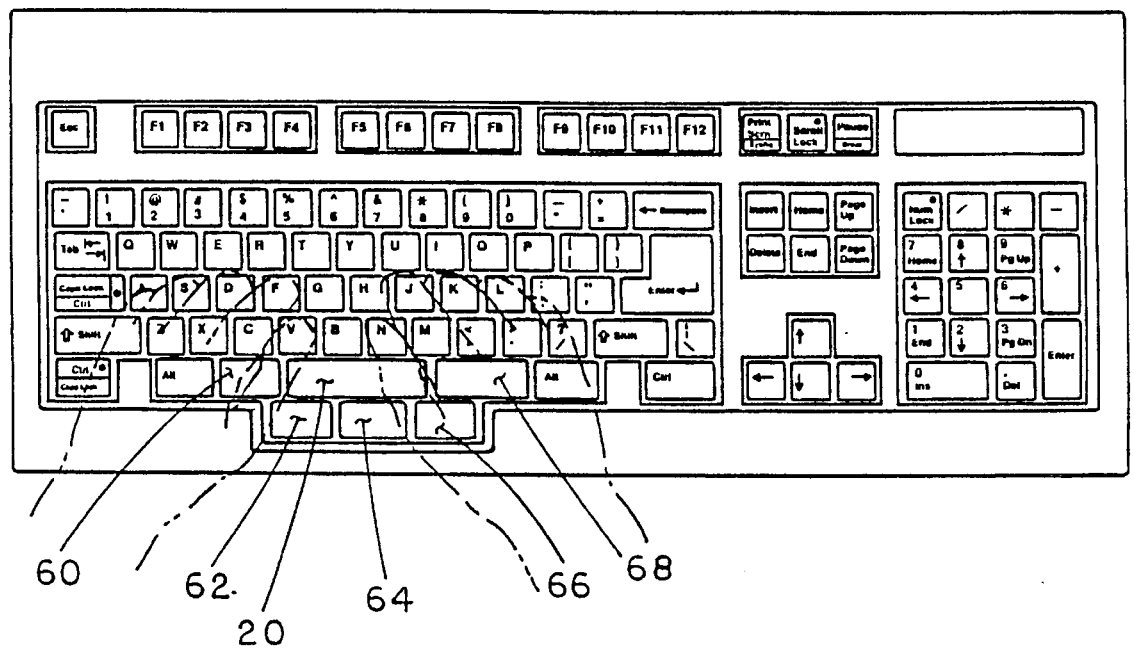
FIG. 9 shows another embodiment of the present invention with non-alphanumeric keys located on either side of and below the spacebar.
Figure 10:
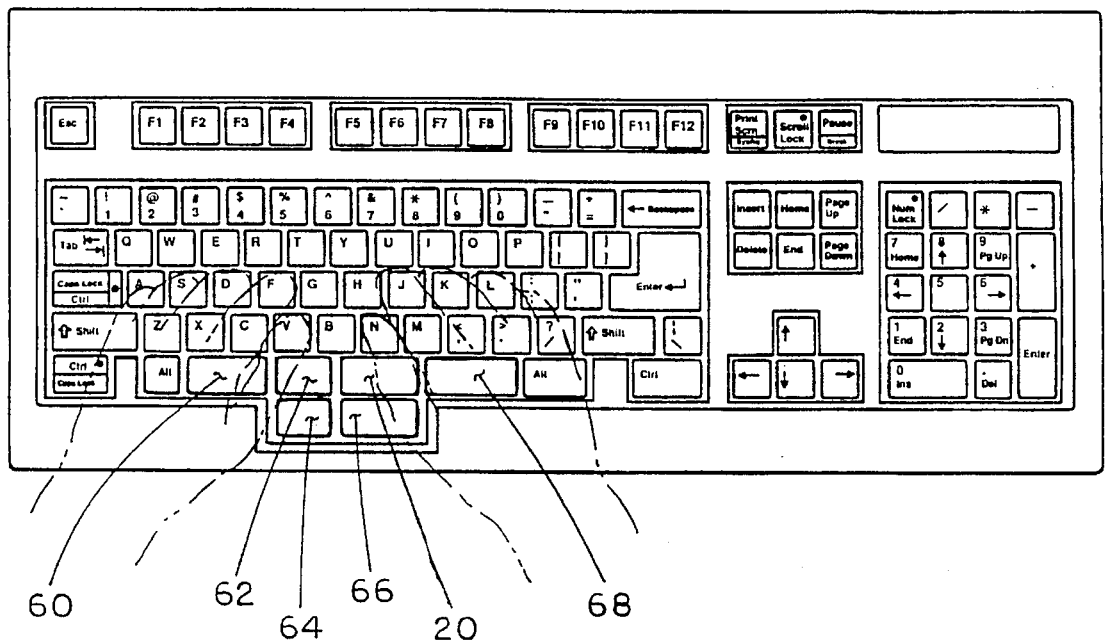
FIG. 10 shows another embodiment of the present invention which combines the invention of U.S. Pat. No. 5,143, 462 with one of the aforementioned embodiments.

FIGS. 9 and 10 show configurations with five non-alphanumeric keys pins the space key 20,60,62,64,66,68 within comfortable reach of one or both thumbs. In FIG. 9 the five non-alphanumeric keys are positioned with three of said keys below the spacebar and one on either side. As in other embodiments, any possible allocation of functions to the six keys 20,60,62,64,66,68 is comprised by the invention and extensive elaboration on the possible allocations is not warranted herein. All such possible allocation combinations are obvious to those skilled in the art.

FIG. 10 illustrates use of the present invention in what may be a particularly useful combination with the invention shown in U.S. Pat. No. 5,143,462. Although any non-alphanumeric function allocation in FIG. 10 to the keys 20,60,62,64,66,68 is comprised by the invention, one particularly useful one may employ key 60 as left cursor, key 62 as backspace/erase, key 68 as right cursor, and keys 64 and 66 as up cursor and down cursor, respectively. Or keys 64 and 66 may instead be home and end keys, respectively; or delete and end keys. Keys 20 and 62 may be interchanged and their dimensions modified as suitable. As with other embodiments any sub-function allocations (i.e., in tandem with other keys such as shift, alt, control) may be employed as are suitable.

Other Embodiments

Specific embodiments shown hereinabove have comprised non-alphanumeric keys within comfortable reach of at least one thumb numbering from one (see embodiments one and two) to five (embodiment 6). Obviously the invention comprises greater numbers of such non-alphanumeric keys so located of six, seven, eight, and higher. For example, in FIG. 10, one or more additional non-alphanumeric key(s) may be located between keys 64 and 66. As such extensions of the embodiments shown herein would be obvious to those skilled in the art, they will not be elaborated on herein.

A particularly efficient mode of the invention relates to thumb activated control function operations. Virtually all word processing programs employ liberal use of the control key in tandem with other keys for many common operations. For example, holding down the control key along with the p key, typically results in printing of the current document.

Control along with the s key typically saves the document. Control along with the i key results in italic typeface. In current keyboard designs, the touch typist invariably has to avert her eyes from the text and move her hand in order to depress and hold the control key. It then takes time to return the hands and eyes have to return to their prior locations in order resume typing. But with the present invention, in the thumb activated control key mode, such wastage is eliminated. Without averting the hands or eyes the touch typist can activate and hold the control key while simultaneously depressing some other key. One advantageous embodiment comprises two such control keys on either side of the spacebar (typically, but not necessarily, to the outside of each thumb) which the thumb of either hand could use to activate the control function while a finger of the opposite hand simultaneously depressed the desired additional key. This is obviously a much more convenient, efficient, comfortable, and practical means for activating control function activities.

Further, the sides of keys may be used to activate certain non-alphanumeric functions other than those activated by pressing downward on the top face. For example, the front face of either key 20 or key 30 (or both) may be used as a mouse button (or mouse buttons) for use with track balls, cursor balls, IBM's Trac Point II, or similar type cursor control means other than the standard mouse. By permitting activation of the mouse button functions by pushing on the front face (the side of the key nearest the typist) of these keys, mouse control could be done efficiently and conveniently. Further, less space would be taken up on the keyboard than is presently used for mouse button functions. Any embodiment described or implied herein may incorporate this added feature of transverse activation (for mouse buttons or other functions) into any of its keys. Any of many various mechancal/electrical means could be employed to permit such transverse activation of a given key. Two of these are described in U.S. Pat. No. 5,358,343 issued to the present inventor.

Advantages Over Prior Art

This invention can thus be seen to solve all of the problems delineated in the "Description of Prior Art" section presently associated with cursor movement and activation of other non-alphanumeric keys in a simple, novel, and manifestly ergonomic and efficient manner.

While the above description contains many specificities, the reader should not construe these as limitations on the scope of the invention, but merely as exemplifications of preferred embodiments thereof. Those skilled in the art will envision many other possibilities that are within its scope. For example, any of the embodiments may use any shape or dimensions of keys, including square and elongate, located in many different locations. The edges of keys shown in the figures herein are not restricted to the precise locations shown in said figures. For example, in FIG. 7 key 52 may have its right edge more to the right than as shown, with the left edge of key 20 also more to the right. As another example, in FIG. 9, the right side of key 60 and the left side of key 20 may be more to the right. The keys and the keyboard may be of any material, size, and shape, so long as said keyboard is an alphanumeric keyboard such as those typically used by touch typists. Any other mechanism which can effect the same result as a key may be substituted in any embodiment, whether implied or expressed, of the invention.

Any device which comprises non-alphanumeric keys situated on the keyboard such that they may be activated comfortably by one, either, or both thumbs is comprised by the present invention. One or more of said non-alphanumeric keys may be located directly under one or both thumbs when the hands are in the standard touch typing position or they (it) may be located away from the regions directly below the typist's thumb(s).

The invention, in its very essence and above all else, is meant to provide comfort to typists. Thumb activation of non-alphanumeric keys via thumb activation which might be possible but which is uncomfortable is certainly not the invention conceived by the present inventor. It is obvious, therefore, in the use herein of the terms "touch typing position" and "within reach of a thumb", that these terms inherently mean comfortable activation by a thumb. As but one example which is not comprised by the present invention, consider a typist having the fingertips of his hands placed on the "home row" (i.e., for a QWERT keyboard the left hand fingers would be on the a,s,d, and f keys). The typist could twist his left hand such that the fingers remained on the a,s,d, and f keys while having the left thumb depress the y key. Yet one would certainly not consider the y key within reach of the thumb with the fingers positioned on the keys in touch typing position. Indeed, not only is striking the y key in such a position with the thumb anything but comfortable, but the fingers are certainly no longer in touch typing position when it is done either. Hence any positioning of non-alphanumeric keys such that the fingers (hands) are twisted or contorted out of the normal configuration in which they are used during touch typing is not comprised by the present invention. As a further example, on a QWERT keyboard it is possible to place keys in the row of the spacebar adjacent at least part of the x,z, comma, or period keys which could be reached by thumbs by contorting and twisting the hands, but which could hardly be thumb activated comfortably. In such thumb activation the fingers would no longer be positioned on the keys in tough typing position and hence such key positioning would not be comprised by the present invention. Hence use of the term "within reach of the thumbs" as used herein means within comfortable reach of the thumbs with the hands remaining in touch typing position.

The use of the term "fingers" comprises the thumbs (i.e., comprises all five digits of a hand) unless used specifically to reference the four fingers in contradistinction to the thumb. Additionally, stating that the hands are positioned in touch typing position is equivalent to stating that the fingers are positioned in touch typing position.

Figure 12:
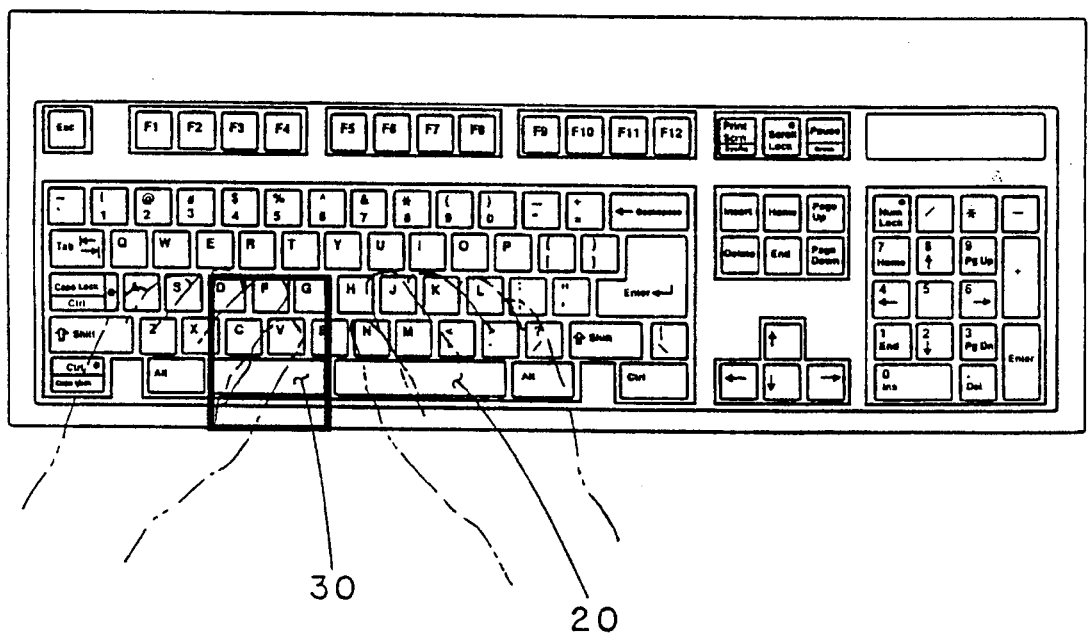
FIGS. 12 shows an outlined region of a keyboard within which region the thumb activated non-alphanumeric key(s) may be located.
Figure 13:
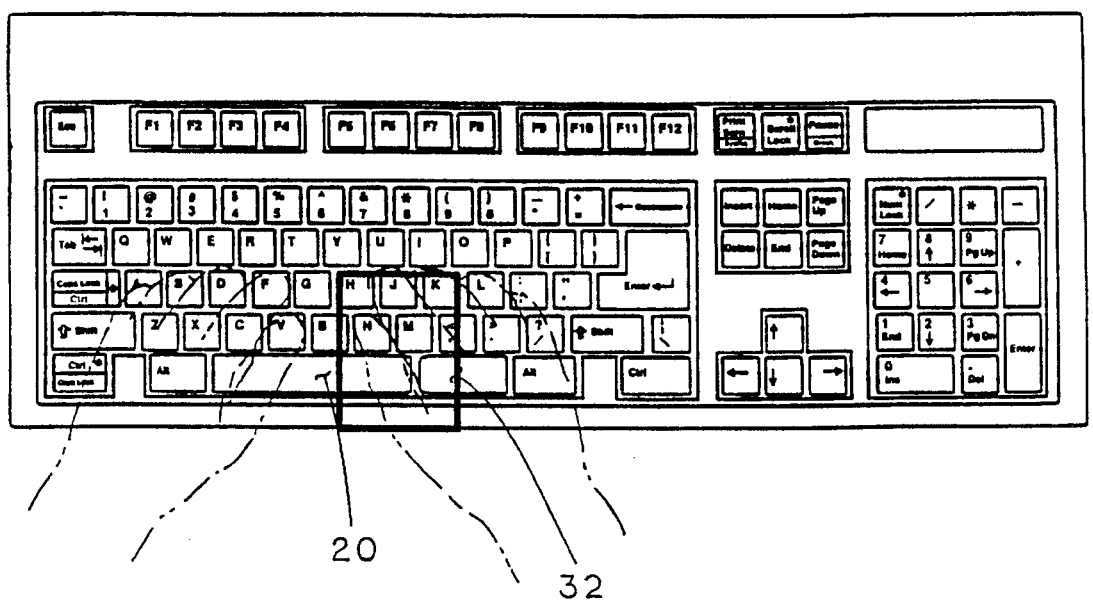
FIGS. 13 shows an other outlined region of a keyboard within which region the thumb activated non-alphanumeric key(s) may be located.

FIGS. 12 and 13 provide an aid to understanding the idea of comfort and ease comprised by thumb activation as in the present invention, In FIG. 12 the region which may be considered comfortable thumb activation may extend as far as shown in the box outlined, FIG. 13 shows a similar region. These regions may be defined with the following language:

Said region of the keyboard may be considered bounded by a straight first line segment extending from a first key upon which a middle finger rests when hands and fingers are in touch typing position to a second key located adjacent an index finger key upon which an index finger rests; a second straight line segment perpendicular to the first line segment intersecting one endpoint of the first line segment; a third straight line segment perpendicular to the first line segment intersecting an other endpoint of the first line segment; and an edge of the keyboard intersected by said second and third straight lines, An alternative description is:

Said region of the keyboard may be considered bounded by two keys adjacent left and right sides of an index finger key upon which an index finger rests when hands and fingers are in touch typing position, a near edge of the keyboard nearer the typist than any other edge, and two lines intersecting the near edge perpendicular to said near edge.

Yet another description of the region(s) is:

Said region of the keyboard may be considered bounded by a first line passing from the center of two middle finger keys upon which two middle fingers rest when hands and fingers are in touch typing position, a second line passing from the center of the left middle finger key perpendicular to the first line, a third line passing from the center of the right middle finger key perpendicular to the first line, and an edge of the keyboard nearer the typist than any other edge.

These descriptions are not limited to the specific keyboard designs shown in FIGS. 12 and 13, but apply generically to any keyboard design.

Another way of considering the region considered "within (comfortable) reach of a thumb" is to define it in terms of distance measured in inches. Hence if one were to consider the location where the thumb touches during touch typing when it activates a space (or a backspace/erase according to U.S. Pat. No. 5,143,462) then "comfortable" may be defined as roughly within an inch of said location. It may possibly be somewhat greater than this number, but using the "one inch" value may assist in expressing the invention in appropriate claim language.

"Comfortable" may also be defined as being within a certain number of key widths from the same location where the thumb normally touches down during touch typing. On a QWERT keyboard, for example, the left thumb normally touches down just below the v key (the right thumb just below the n key). In that context, a comfortable range may be defined in terms of one and a haft key widths.

Figure 11:
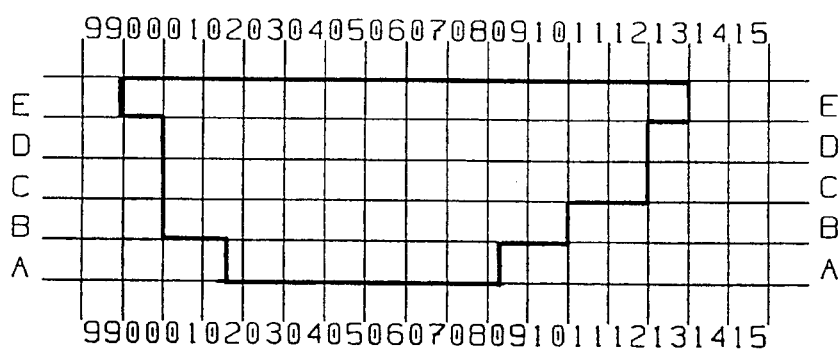
FIG. 11 shows the prior art keyboard grid numbering scheme figure published by the International Organization for Standardization wherein each column is designated by a two digit number and each row by a letter.

In the standard keyboard for which the ISO standards are being formulated by the International Organization for Standardization the rows and columns are designated via a grid (see FIG. 11) in which two digit numbers are used for columns and letters are used for rows. The spacebar in a standard keyboard version being considered for the ISO standards is located in the A row from columns 03 to 07, i.e., from A03 to A07. The present invention is not limited to the standard keyboard addressed by the ISO standards keyboard as referenced by FIG. 11. In such keyboards, however, the non-alphanumeric key(s) which may be thumb activated according to the present invention may be located anywhere on the A row within comfortable reach of one or two thumbs. Typically, such non-alphanumeric key location(s) according to the present invention may be anywhere, in whole or in part, within the region A03 to A07, i.e., the location of the standard spacebar in conventional (ISO standard) keyboards. One or more may also be located below the A row (nearer the typist than the A row). Typically, such thumb activated keys may be situated, in whole or in pan, between columns 01 and 12. For example, in FIG. 2 key 30 may extend, at least in part, over regions A03, A04, and/or A05. It may even extend over A02 and or A06. Row and column designations for other embodiments with other numbers and/or locations of non-alphanumeric keys is obvious. In some embodiments, a row under the A row is employed and, for present purposes, this row may be designated row AA. Embodiments with keys in row AA would then have non-alphanumeric keys located in columns anywhere between AA01 and AA12.

The invention is not limited to keyboards designed as shown in the figures. For example, "split" keyboards having left and right sections which may be detached and separate from one another are comprised by the invention. So are single piece construction keyboards with alphanumeric (and possibly non-alphanumeric) keys arranged in groups which are separate from each other. For example, a single piece keyboard framework may have a group of keys on the left reachable by the left hand fingers separated in space from a group of keys on the right reachable by the right hand fingers.

The word pressure when used herein as applied to a key may also be interpreted as movement or touch. Activation does not necessarily have to be by downward depression, but may be by other means as well. The electromechanical means for activating each function, i.e., the "switching" or other means, for sending the appropriate signal to the computer when a given key is activated is not relevant to the working of the invention. Such means are common, and are both trivial and well known to those skilled in the art. The present invention entails novel placement of particular keys and is suitable for use with any suitable electromechanical means for activation.

Key locations other than those shown explicitly herein are comprised by the invention, so long as the non-alphanumeric keys delineated herein are within comfortable reach of one or two thumb(s). For example, non-alphanumeric keys located above or below (nearer or further from the typist's body) the spacebar (i.e., along an edge) are comprised by the invention, as are non-alphanumeric keys located above or below the spacebar row in combination with being to either side of one or both end(s) of the spacebar. (In the present context, "end" refers to a short side of an elongate key such as the standard spacebar, and "edge" refers to a long side of such a key.) One or more of the non-alphanumeric keys may be adjacent the spacebar, may have a region devoid of keys between it (them) and the spacebar, or may have one or more other keys between it (them) and the spacebar. Other possible variations are obvious to those skilled in the art, and the invention is not limited to the particular configurations explicitly shown herein.

Any location for non-alphanumeric keys positioned on the typist side of any of the alphanumeric keys x,c,v,b,n,m, comma, and period keys is comprised by the invention. Said non-alphanumeric keys may be adjacent said alphanumeric keys or may have a region, with or without other keys, therein between as long as they may be activated comfortably by a touch typist's thumb(s).

Combinations of any of the embodiments described hereinabove are comprised by the invention. Combinations of any embodiment(s) of the present invention with prior art are also comprised by the invention. For example, any embodiment may be combined with the "Thumble-ina" device described under prior art, or with any other prior art device.

The invention comprises any of the embodiments expressed or implied herein wherein any of such keys may be ergonomically activated by one or both thumbs with one or two hands in touch typing position. Further, any keyboard utilizing the invention may be programmable or changeable by means of switching or otherwise such that the function(s) performed by any one of the keys shown in this invention may be changed to suit the desire of the typist. Any allocation of any of the non-alphanumeric functions described herein to any keys which are located such that they may be comfortably thumb activated by a touch typist with hands in touch typing position without interrupting the touch typing process is comprised by the invention.

All comments made in any embodiment which are of a generic nature are applicable to all possible embodiments of the invention. Further, the invention is not restricted to computer and electric typewriter keyboards but can be used in any type of input typing system.

Accordingly, the scope of the invention should be determined not by the embodiments described, but by the appended claims and their legal equivalents.

I claim:

1. A keyboard for a computer, electronic typewriter, or word processor, comprising:

a plurality of alphanumeric keys comprising twenty-six alphabetic keys and ten numeric keys arranged corresponding to touch typing position each of which alphanumeric keys automatically effects a different alphanumeric character, a means to effect a space wherein said means to effect a space is positioned within reach of at least one thumb of a touch typist having hands and fingers positioned on said keyboard in touch typing position, a plurality of non-alphanumeric keys, and a means to actuate a control function wherein actuation of said control function simultaneously with one alphabetic key automatically effects a specific function such as, but not limited to, one of save, print and type italics, wherein said means to actuate the control function is a key labeled control and said means to actuate the control function is positional within reach of at least one thumb of the touch typist having hands and fingers positioned on the keyboard in touch typing position.

2. The keyboard of claim 1 wherein said means to effect a space is a spacebar, and said means to actuate a control function is positioned within one inch of a location on the spacebar which the touch typist touches when actuating said spacebar with said at least one thumb.

3. The keyboard of claim 1 wherein said means to actuate a control function is positioned within one inch of a location on a backspace/erase key which the touch typist touches when actuating said backspace/erase key with said at least one thumb.

4. The keyboard of claim 1 wherein said means to effect a space is a spacebar, and said means to actuate a control function is positioned within one and a half key widths of a location on the spacebar which the touch typist would touch when actuating said spacebar with said at least one thumb.

5. The keyboard of claim 1 wherein said means to actuate a control function is positioned within one and a half key widths of a location on a backspace/erase key which the touch typist would touch when actuating said backspace/erase key with said at least one thumb.

6. The keyboard of claim 1 wherein said means to effect a space is a spacebar, and said means to actuate a control function is positioned between the spacebar and the touch typist.

7. The keyboard of claim 1 wherein said means to actuate a control function is positioned between a backspace/erase key and the touch typist.

8. The keyboard of claim 1 wherein said means to actuate a control function is positioned, at least in part, within half a key width of a middle finger key column comprising keys actuated by the middle finger of the touch typist.

9. The keyboard of claim 1 wherein said means to actuate a control function is positioned adjacent the c key.

10. The keyboard of claim 1 wherein said means to actuate a control function is positioned adjacent the m key.

11. The keyboard of claim 1 wherein said means to effect a space is a spacebar, and said means to actuate a control function is positioned adjacent the spacebar key.

12. The keyboard of claim 1 wherein said means to actuate a control function is positioned adjacent a backspace/erase key.

13. The keyboard of claim 1 wherein said means to actuate a control function is located, at least in part, in a region of the keyboard bounded by a straight first line segment extending from a first key upon which a middle finger rests when hands and fingers are in touch typing position to a second key located adjacent an index finger key upon which an index finger rests; a second straight line segment perpendicular to the first line segment intersecting one endpoint of the first line segment; a third straight line segment perpendicular to the first line segment intersecting an other endpoint of the first line segment; and an edge of the keyboard intersected by said second and third straight lines.

14. The keyboard of claim 1 wherein said means to actuate a control function is located, at least in part, in a region of the keyboard bounded by two keys adjacent left and right sides of an index finger key upon which an index finger rests when hands and fingers are in touch typing position, a near edge of the keyboard nearer the typist than any other edge, and two lines intersecting the near edge perpendicular to said near edge.

15. The keyboard of claim 1 wherein the means to actuate a control function is located, at least in part, in a region of the keyboard bounded by a first line passing from the center of two middle finger keys upon which two middle fingers rest when hands and fingers are in touch typing position, a second line passing from the center of the left middle finger key perpendicular to the first line, a third line passing from the center of the right middle finger key perpendicular to the first line, and an edge of the keyboard nearer the typist than any other edge.

16. The keyboard of claim 1 wherein the means to actuate a control function is located within reach of both thumbs.

17. The keyboard of claim 1 wherein the at least one means to actuate a control function comprises two means.

18. The keyboard of claim 1 wherein the at least one means to actuate a control function comprises two means, wherein the first of said two means is located leftward of the touch typist's left thumb, and the second of said two means is located rightward of the touch typist's right thumb.

19. The keyboard of claim 1 wherein the arrangement of alphanumeric keys conforms to ISO row and column designation standards.

* * * * *